United States Patent
Mueller et al.

(10) Patent No.: US 6,209,383 B1
(45) Date of Patent: Apr. 3, 2001

(54) ARRANGEMENT FOR CALIBRATING SEVERAL GYRO SYSTEMS

(75) Inventors: Reinhard Mueller, Puchheim; Gert Trommer, Munich, both of (DE)

(73) Assignee: Daimler-Benz Aerospace AG, Munich (DE)

( * ) Notice: Subject to any disclaimer, the term of this patent is extended or adjusted under 35 U.S.C. 154(b) by 0 days.

(21) Appl. No.: 09/081,764

(22) Filed: May 21, 1998

(30) Foreign Application Priority Data

May 21, 1997 (DE) .............................................. 197 21 217

(51) Int. Cl.[7] .............................. G01P 21/02; G01C 25/00
(52) U.S. Cl. ................................................. 73/1.37; 73/1.77
(58) Field of Search ..................................... 73/1.37, 1.38, 73/1.77

(56) References Cited

U.S. PATENT DOCUMENTS

| | | | |
|---|---|---|---|
| 1,374,162 | * 4/1921 | Meitner | 73/1.77 |
| 2,882,717 | * 4/1959 | Brown | 73/1.77 X |
| 2,882,718 | * 4/1959 | Shaw | 73/1.37 |
| 3,164,978 | * 1/1965 | Sharman et al. | 73/1.77 |
| 3,277,725 | * 10/1966 | Kingsborough et al. | 73/1.37 |
| 3,330,149 | * 7/1967 | Scott, Jr. | 73/1.77 |
| 3,640,137 | * 2/1972 | Allen et al. | 73/1.38 X |
| 3,680,355 | * 8/1972 | Goldstein et al. | 73/1.77 |
| 4,884,771 | * 12/1989 | Scheit et al. | 73/1.77 X |
| 5,065,612 | * 11/1991 | Ooka | 73/1.77 |
| 5,277,066 | 1/1994 | Marshall | 73/663 |
| 5,421,187 | 6/1995 | Morgan . | |
| 5,955,668 | * 9/1999 | Hsu et al. | 73/1.37 X |

FOREIGN PATENT DOCUMENTS

| | | |
|---|---|---|
| 1943026 | * 3/1971 (DE) | 73/1.77 |
| 526279 | 9/1940 (GB) . | |

OTHER PUBLICATIONS

XP-002100981—"Calculator-Controlled Testing of Rate Gyroscopes", Richard Brown, Smiths Industries, Ltd., pp. 81–86 Antotest on 76, Arlington, Texas, Nov. 1976.

* cited by examiner

*Primary Examiner*—Thomas P. Noland
(74) *Attorney, Agent, or Firm*—Evenson, McKeown, Edwards & Lenahan, P.L.L.C.

(57) ABSTRACT

Apparatus for simultaneous calibration of several multi-axis gyro systems, particularly fiber-optical gyro systems, in all measuring axes, uses a single-axle rotary table. A rotary frame is connected with the axis of rotation of the single-axis rotary table, and the gyro systems are arranged thereon in such a manner that corresponding measuring axes of the gyro systems experience an identical component of the rotation of the rotary frame, and none of the components is zero.

6 Claims, 2 Drawing Sheets

ARRANGEMENT FOR CALIBRATING SEVERAL GYRO SYSTEMS

BACKGROUND AND SUMMARY OF THE INVENTION

This application claims the priority of German patent document 197,21,217.4, filed May 21, 1997, the disclosure of which is expressly incorporated by reference herein.

The invention relates to an arrangement for simultaneous calibration of several multi-axis gyro systems, particularly fiber-optical gyro systems, in all measuring axes by means of a single-axis rotary table.

Known fiber optic gyros which are used as rate of rotation sensors, such as disclosed, for example, in *Applied Optics*, Vol. 29, No. 36, Dec. 20, 1990, Pages 5360 to 5365, have measuring value sensors which generate complicated temperature-dependent output signals. The measured rate of rotation is computed from these signals, using an analyzing formula corresponding to the special gyro type. Such a computation formula is indicated, for example, in Equation 26 in the above-mentioned publication and reflects the relationship between the signals P1, P2 and P3 of the photo diodes used as measuring value sensors and the measured rate of rotation $\omega$. To account for individual characteristics of the gyro, special coefficients f1 to f6 must be determined beforehand by the calibration of the gyro on a rotary table. For this purpose, the gyro is caused to rotate at several known rates of rotation; the measuring signals of the photo diodes are measured; and the coefficients are computed from them. These are then programmed into the memory of the gyro and are used from that point on as to compute inertial rates of rotation by the gyro computer.

Since the coefficients f1 to f6 depend on the temperature, in order to compensate for temperature-dependent errors, the rotations on the rotary table must be carried out at different temperatures. Therefore, to operate a gyro in the temperature range between −53° C. and +85° 73 C. in a temperature-compensated manner, the determination of the coefficients must take place by means of several known rates of rotation on a rotary table with an integrated temperature chamber at discrete temperature support points in the whole temperature range. The passage through the whole temperature range and the determination of the coefficients at discrete temperature support points requires considerable time, typically 12 hours.

In a three-axis gyro system, all three orthogonal axes must be calibrated individually. According to the state of the art, this can be done in two ways:

1. The coefficients are determined at different temperature support points successively, first for the X-axis, then for the Y-axis, and then for the Z-axis. The rotation about the three different axes takes place by resetting the gyro system on the rotary table to the corresponding axes at the end of the respective temperature cycle. The total time of the calibration is thus three times as long as that of a single-axis gyro, with the respective resetting times added.

2. The coefficients for the different axes can also be determined successively at the same support point temperature using a multi-axis rotary table which permits rotation about each of the axes. Thus, at a defined temperature, a rotation takes place, for example, first about the X-axis, then about the Y-axis and then about the Z-axis. In this process, the coefficients are computed for the three axes at a particular temperature; then a new support point temperature is started, and the whole operation is repeated. The time requirement for this method is comparable to that of the first method; however, in addition, a more cost-intensive multi-axis rotary table is required within the temperature chamber.

It is therefore an object of the present invention to provide an arrangement for calibrating multi-axis gyro systems, by means of which several gyro systems can be calibrated simultaneously, in a shorter time period than previously possible.

This object, and other objects and advantages, are achieved by the arrangement according to the invention, which can be used on a single-axis rotary table with an integrated temperature chamber, and the above-mentioned coefficients determined simultaneously for all measuring axes. For this purpose, each gyro system is arranged on a rotary frame in such a manner that the corresponding measuring axes of the gyro systems (that is, all X-axes, all Y-axes and all Z-axes), form an identical component of the rotation of the rotary frame and none of the components is zero. This is achieved, for example, by arranging the plane diagonals or body diagonals of the measuring axes of all gyro systems within the rotary frame at an identical angle (including the zero angle) with respect to the axis of rotation of the rotary frame. In this manner, all three measuring axes of all gyro systems are rotated simultaneously for each temperature support point and the simultaneous measuring signals of the individual photo diodes of all measuring axes are used to compute the coefficients. Subsequently, the process is repeated for the next temperature support point. This procedure thus lasts no longer than that of a single-axis gyro using a single-axis rotary table.

The rotary frame is advantageously constructed such that all gyro systems placed in it are arranged n-radiated symmetrically about its axis of rotation in a distributed manner. In addition, the gyro systems can be arranged within the rotary frame in several planes perpendicular to its axis of rotation.

Other objects, advantages and novel features of the present invention will become apparent from the following detailed description of the invention when considered in conjunction with the accompanying drawings.

DETAILED DESCRIPTION OF THE DRAWINGS

Figure 1:
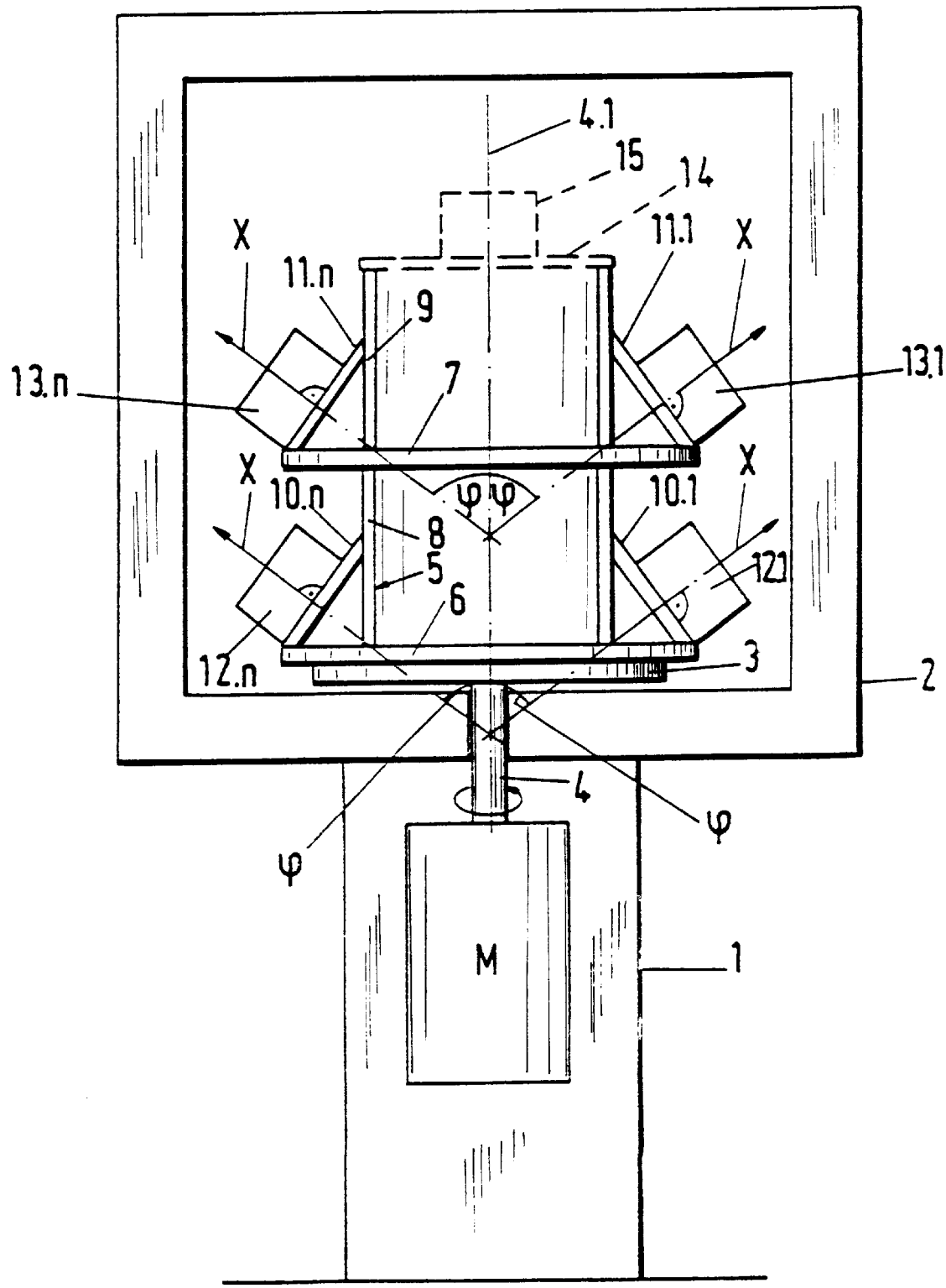
FIG. 1 is a cross-sectional view of a single-axis rotary table according to the invention, with a rotary frame for fiber-optic gyro systems.

FIG. 1 shows a single-axis rotary table 1 (known per se) with a fitted-on temperature chamber 2 in which a rotary plate 3 rotates at rates of rotation which can be adjusted and controlled. For this purpose, the rotary plate 3 is connected with a controllable driving motor M by way of a shaft 4 which is guided through the floor of the temperature chamber 2. In the illustrated case, a two-level rotary frame is fastened on the rotary plate 3, each level having a base plane 6 and 7, a cylindrical support ring 8 and 9 and receiving surfaces 10.1 to 10.n and 11.1 to 11.n which are uniformly distributed along the circumference. In the illustrated example, three-axis fiber-optic gyro systems are fastened on these receiving surfaces for simultaneous calibration at several defined temperature points.

The calibrating device according to the invention can be used without regard to the particular physical measuring principle of the gyro system to be calibrated (for example, fiber-optical, mechanical, vibrating structure). The rotating movement to be measured by the measuring system (that is, the desired standard for the calibration) is defined by the geometry of the arrangement. In the illustrated example, the gyro systems have a cylindrical form, in which the cylinder axis also represents one of the measuring axes (in this illustrated example, the X-axis).

Figure 2:
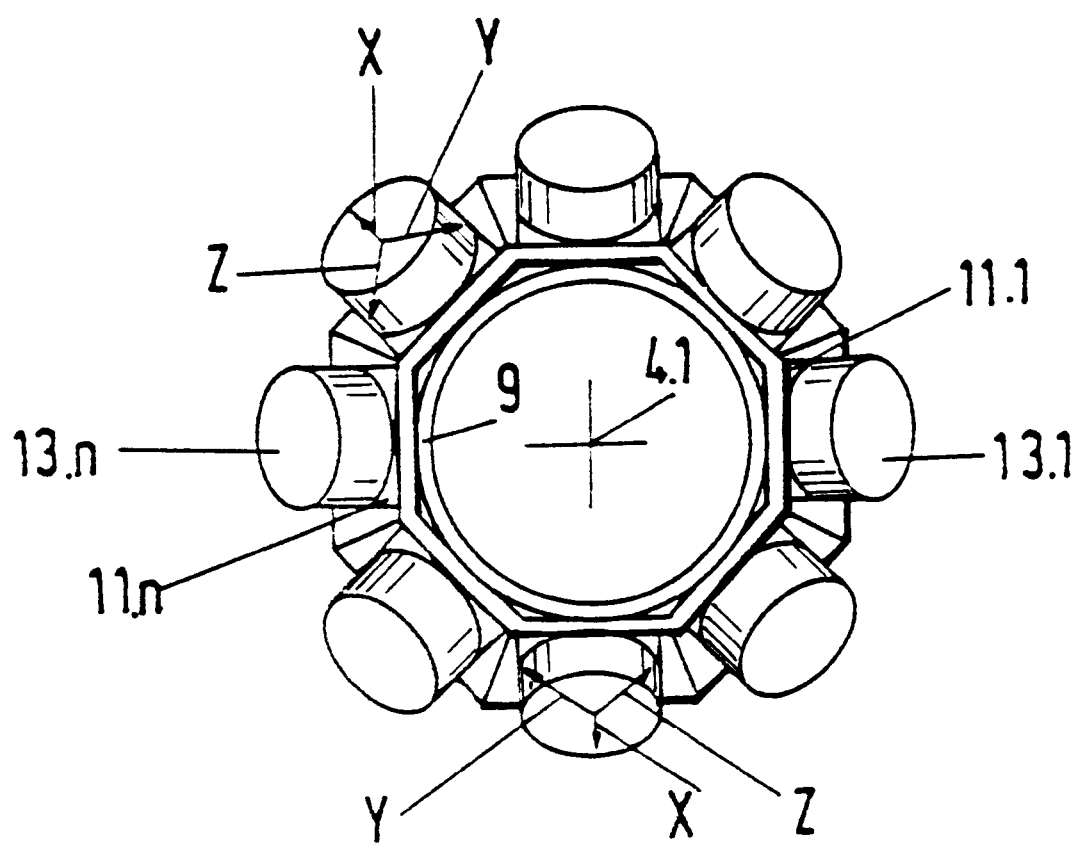
FIG. 2 is a top view of the rotary frame and the gyro systems according to FIG. 1.

The orientation of the receiving surfaces 10.1 to 10.n and 11.1 to 11.n (and thus the orientation of the X-axes of all gyro systems with respect to the axis of rotation 4.1) is selected such that the angle $\phi$, which is enclosed by these axes, of the condition $\cos\phi=1 \sqrt{3}$ is sufficient. That is, $\phi$ is approximately equal to 54.74°. The orientation of the other measuring axes, (the Y-axis and the Z-axis) is better shown in FIG. 2 and is selected, on the one hand, so that both such axes of each gyro system each extend in parallel to the plane of the associated receiving surface, and mirror-symmetrically with respect to the plane defined by the axis of rotation 4.1 and the respective X-axis. With this orientation, the body diagonal of the three measuring axes of each gyro is parallel to the axis of rotation 4.1. Therefore all measuring axes of a gyro system during a rotation of the rotary frame 5 receive an identical component of rotation. Since this applies to all gyro systems on the rotary frame, all X- Y- and Z-axes experience an identical component of the rotation because their respective components in the direction of the axis of rotation 4.1 are identical.

When the gyro systems are oriented on the rotary frame, it is not absolutely necessary that the individual measuring axes of a single gyro system mutually have a component of an identical size with respect to axis of rotation 4.1. It must only be ensured that the corresponding measuring axes of all gyro systems (for example, all X-axes) have the same component with respect to the axis of rotation 4.1.

Because of the concentric, multi-story construction of the rotary frame 5, use of the volume of the thermal chamber 2 can be optimized for calibration of a large number of gyro systems simultaneously.

If one or more of the measuring axes of a gyro system is incorrectly aligned, the projection of the rotation of the rotary frame on the respective measuring axis, in the case of the diagonal setting, will have the same error with respect to the magnitude during the calibration. The result is an error in the coefficients for the so-called scale factor (here, f6) which leads to a scale factor error of the same magnitude. However, this error does not depend on the temperature, because it results from the precision of the mechanical alignment of the measuring axes which (at least in a first approximation) is independent of the temperature. This error can be determined simply: following the temperature-dependent diagonal calibration, the gyro system is first rotated about the X-axis, then about the Y-axis and finally about the Z-axis, at a constant temperature and, at a known rate of rotation which is defined by the rotary table. The discrepancy in the measuring rate of rotation is then determined by comparing the gyro signal and the rate of rotation of the rotary table. From that, finally, the residual error in the scale factor can be determined, and added as a correction quantity to the gyro coefficients (in this example, the correction of f6(T)) with the factor of the discrepancy formed by the relationship between the measured rate of rotation and the rate of rotation of the rotary table). Since the resetting can take place at any temperature (for example, at room temperature), and the start-up of the rates of rotation by means of the rotary table takes place relatively rapidly, this correction will not significantly increase the calibrating time. In the event of such a correction of the scale factor, it is advantageous for the uppermost plane of the rotary frame 5 to have an end plate 14 with a central receiving device for a single gyro system 15 (in FIG. 1, in each case shown by a broken line).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus for simultaneously calibrating all measuring axes of a plurality of multi-axis gyro systems, said apparatus comprising:

a single-axis rotary table; and a rotary frame connected along an axis of rotation of the single-axis rotary table;

wherein the gyro systems are arranged on the rotary frame with corresponding measuring axes of the respective gyro systems aligned to receive an identical component of the rotation of the rotary frame, none of the components being zero.

2. Apparatus according to claim 1, wherein body diagonals of the measuring axes of all gyro systems take up within the rotary frame an identical angle with respect to the axis of rotation of the rotary frame, including the zero angle.

3. Apparatus according to claim 1 wherein the gyro systems are arranged within the rotary frame such that none of their measuring axes extends perpendicularly to the axis of rotation of the rotary frame, and the components in the direction of the axis of rotation are identical for all X-axes, all Y-axes and all Z-axes.

4. Apparatus according to claim 1 wherein the gyro systems are arranged within the rotary frame distributed about the axis of rotation of the single axis rotary table, in an n-radiated symmetrical manner.

5. Apparatus according to the claim 4 wherein the gyro systems are arranged within the rotary frame in several planes which are perpendicular to axis of rotation of the single axis rotary table.

6. Apparatus according to claim 1 wherein the rotary frame has a fastening device arranged in the axis of rotation for rotating an individual gyro system about a measuring axis of said individual gyro system.

* * * * *